United States Patent
Matsubara

(10) Patent No.: US 10,079,985 B2
(45) Date of Patent: Sep. 18, 2018

(54) MICROSCOPE SYSTEM

(71) Applicant: OLYMPUS CORPORATION, Tokyo (JP)

(72) Inventor: Daiki Matsubara, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 225 days.

(21) Appl. No.: 15/145,168

(22) Filed: May 3, 2016

(65) Prior Publication Data

US 2016/0373670 A1 Dec. 22, 2016

(30) Foreign Application Priority Data

Jun. 17, 2015 (JP) .................................. 2015-121874

(51) Int. Cl.
*H04N 9/47* (2006.01)
*G01N 23/04* (2018.01)
*H04N 5/357* (2011.01)
*G02B 21/36* (2006.01)

(52) U.S. Cl.
CPC ......... *H04N 5/3572* (2013.01); *G02B 21/365* (2013.01)

(58) Field of Classification Search
CPC ..... H04N 5/3572; H04N 5/378; G02B 21/365
See application file for complete search history.

(56) References Cited

U.S. PATENT DOCUMENTS

| 9,100,598 | B2 * | 8/2015 | Kaminaga | G02B 21/16 |
| 2008/0056610 | A1 * | 3/2008 | Kanda | G02B 21/365 382/282 |
| 2013/0329033 | A1 * | 12/2013 | Shibata | H04N 5/2355 348/79 |
| 2014/0293035 | A1 * | 10/2014 | Horie | G02B 21/367 348/79 |
| 2016/0124209 | A1 * | 5/2016 | Arai | H04N 1/401 348/80 |

FOREIGN PATENT DOCUMENTS

| JP | 2006-171213 A | | 6/2006 |
| JP | 2012-163777 A | | 8/2012 |
| JP | 2012163777 A | * | 8/2012 |

* cited by examiner

*Primary Examiner* — Tsion B Owens
(74) *Attorney, Agent, or Firm* — Scully, Scott, Murphy & Presser, P.C.

(57) ABSTRACT

A microscope system including an imaging portion, an image-acquisition portion that captures an image of a specimen formed by the imaging portion, a background identifying portion that identifies a background region other than a region containing the specimen in the image acquired by the image-acquisition portion, calibration-data generating portions that generate calibration data for correcting shading contained in the image on the basis of a luminance distribution of the background region, and a shading correcting portion that corrects the luminance of the image by using the calibration data.

3 Claims, 21 Drawing Sheets

FIG. 4

| R | Gr | R | Gr | R |
|---|----|---|----|---|
| Gb | B | Gb | B | Gb |
| R | Gr | R | Gr | R |
| Gb | B | Gb | B | Gb |
| R | Gr | R | Gr | R |

| IMAGING CONDITIONS | | | | CALIBRATION DATA |
|---|---|---|---|---|
| CONDENSER LENS | OBJECTIVE LENS | INTERMEDIATE MAGNIFICATION DEVICE | CAMERA ADAPTOR | |
| CONDENSER LENS A | OB LENS 10× | MAGNIFICATION DEVICE 1× | ADAPTOR 0.5× | CALIBRATION DATA 1 |
| CONDENSER LENS A | OB LENS 2× | MAGNIFICATION DEVICE 2× | ADAPTOR 0.5× | — |
| CONDENSER LENS B | OB LENS 4× | MAGNIFICATION DEVICE 1.25× | ADAPTOR 1× | CALIBRATION DATA 2 |
| CONDENSER LENS B | OB LENS 40× | MAGNIFICATION DEVICE 1.6× | ADAPTOR 0.5× | — |
| CONDENSER LENS B | OB LENS 10× | MAGNIFICATION DEVICE 2× | ADAPTOR 1× | — |

FIG. 19

| OBSERVATION METHOD | BACKGROUND IDENTIFYING CONDITION |
|---|---|
| BRIGHT-FIELD MICROSCOPY | $\alpha < \dfrac{2 \times R_{AVE}}{Gr_{AVE} + Gb_{AVE}} < \beta$ <br><br> $\gamma < \dfrac{2 \times B_{AVE}}{Gr_{AVE} + Gb_{AVE}} < \delta$ |
| DARK-FIELD MICROSCOPY | $Y < \alpha'$ |
| FLUOROSCOPY | $Y < \alpha'$ |
| . | . |
| . | . |

MICROSCOPE SYSTEM

CROSS-REFERENCE TO RELATED APPLICATIONS

This application is based on Japanese Patent Application No. 2015-121874 filed on Jun. 17, 2015, the contents of which are incorporated herein by reference.

TECHNICAL FIELD

The present invention relates to a microscope system.

BACKGROUND ART

In the related art, there is a known microscope system that has a function for subjecting an image acquired by using a microscope to shading correction for removing shading in the image (for example, see Patent Literature 1). In order to correct shading, information about the luminance distribution of a background region excluding a specimen is required. In Patent Literature 1, calibration image data in which only a background region is captured in a state in which a specimen is removed from the optical axis of an objective lens are used for shading correction. With this microscope system, the specimen needs to be removed from the optical axis every time calibration image data for shading are created.

CITATION LIST

Patent Literature

{PTL 1} Japanese Unexamined Patent Application, Publication No. 2006-171213

SUMMARY OF INVENTION

The present invention provides a microscope system provided with an imaging portion that forms an image of a specimen, an image-acquisition portion that captures an image of the specimen formed by the imaging portion, a background identifying portion that identifies a background region other than a region containing the specimen in the image acquired by the image-acquisition portion, a calibration-data generating portion that generates calibration data for correcting shading contained in the image on the basis of a luminance distribution of the background region identified by the background identifying portion, and a shading correcting portion that corrects the luminance of the image by using the calibration data generated by the calibration-data generating portion.

BRIEF DESCRIPTION OF DRAWINGS

FIG. 4 is a diagram showing the arrangement of color filters provided in an image-acquisition device of the microscope system in FIG. 1.

FIG. 14 is a diagram showing an example of a calibration data table stored in a storage portion of the microscope system in FIG. 11.

FIG. 19 is a diagram showing an example of a background identifying condition table stored in a storage portion of the microscope system in FIG. 17.

DESCRIPTION OF EMBODIMENTS

{First Embodiment}

A microscope system 1 according to a first embodiment of the present invention will be described below with reference to FIGS. 1 to 10.

Figure 1:
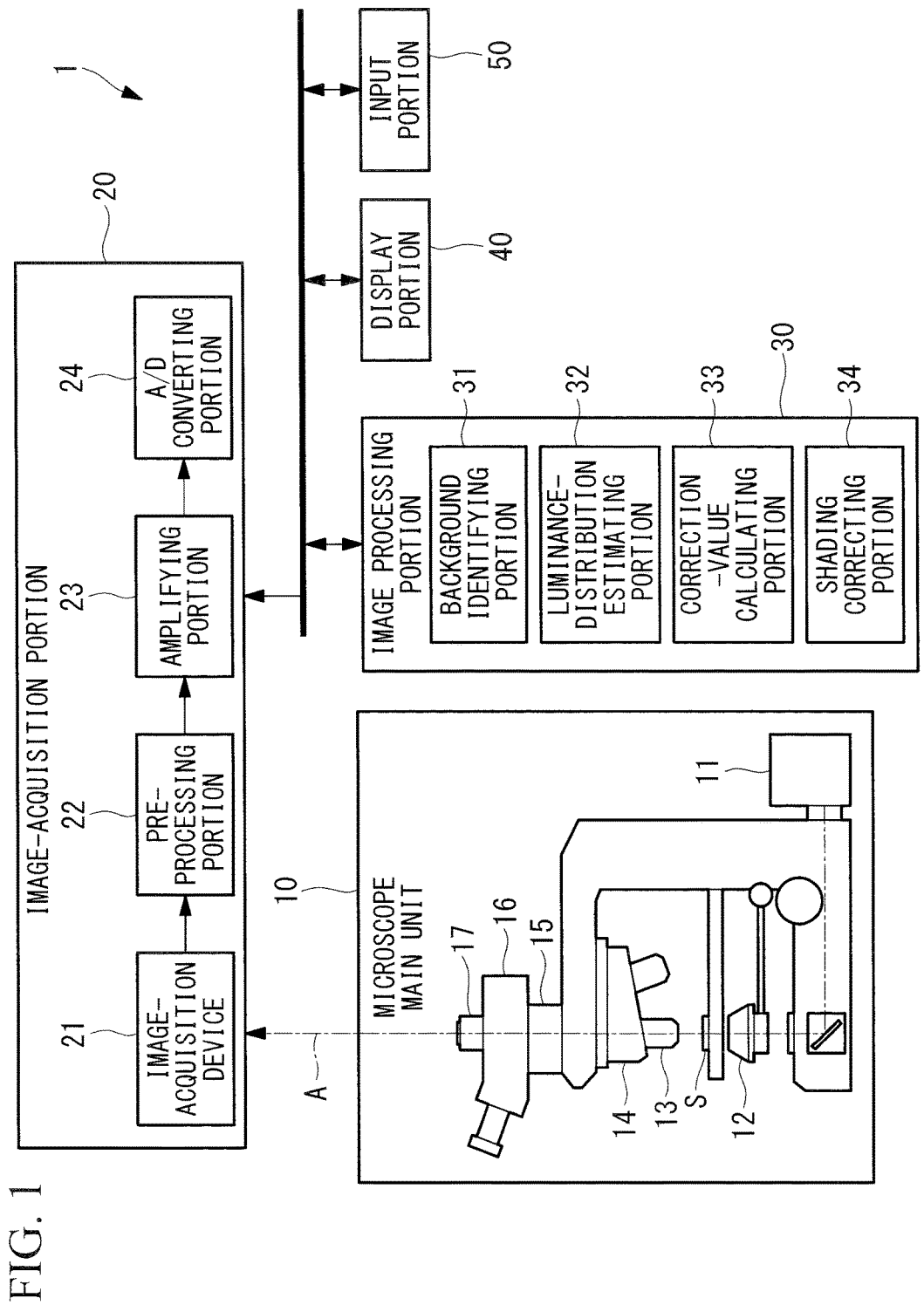
FIG. 1 is an overall configuration diagram of a microscope system according to a first embodiment of the present invention.

As shown in FIG. 1, the microscope system 1 according to this embodiment is provided with a microscope main unit 10 for optically observing specimens S; an image-acquisition portion 20 that acquires image data of an observation image of the specimen S obtained by the microscope main unit 10; an image processing portion 30 that processes the image data acquired by the image-acquisition portion 20; a display portion 40; and an input portion 50. The image-acquisition portion 20, the image processing portion 30, the display portion 40, and the input portion 50 are connected via a bus so as to allow them to communicate with each other.

Figure 2:
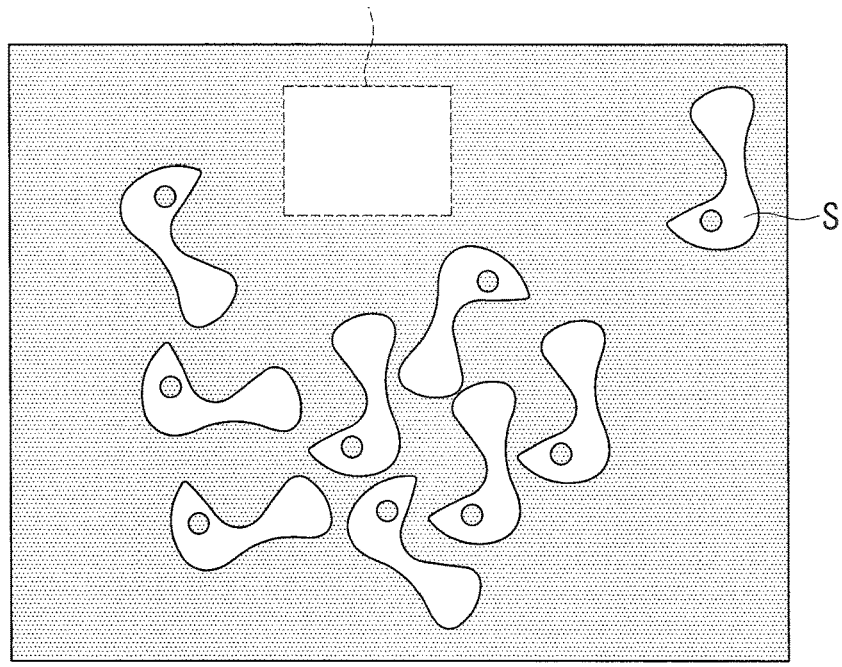
FIG. 2 is a diagram showing an example image acquired by an image-acquisition portion of the microscope system in FIG. 1.

FIG. 2 shows a digital image acquired by the image-acquisition portion 20. As shown in FIG. 2, this embodiment assumes observation of the specimens S (for example, cells) that are distributed only in some regions of the viewing field of the microscope main unit 10. Therefore, in the digital image, specimen regions that correspond to the specimens S and background regions that do not contain the specimens S exist in a mixed manner. In FIG. 2, white regions are the specimen regions, and hatched regions are the background regions.

The microscope main unit 10 according to this embodiment is of the upright type provided with a light source 11, a condenser lens 12, an objective lens (imaging portion) 13, a revolver 14, an intermediate magnification device 15, a trinocular tube 16, and a camera adaptor 17. The microscope main unit 10 may be of the inverted type instead of the upright type.

The condenser lens 12 focuses illumination light coming from the light source 11 and irradiates the specimens S with the illumination light.

The revolver 14 holds a plurality of objective lenses 13 having different properties in terms of magnification or the like, and places one of the objective lenses 13 in an observation optical path A. Light that has passed through the specimens S enters the objective lens 13 in the observation optical path A.

The intermediate magnification device 15, the trinocular tube 16, and the camera adaptor 17 are disposed in the observation optical path A. The magnification of the observation image of the specimens S formed by the objective lens 13 is changed by the intermediate magnification device 15, the observation image is guided to the camera adaptor 17 via an imaging lens of the trinocular tube 16, and the observation image is made to exit from the camera adaptor 17 to the exterior of the microscope main unit 10.

The image-acquisition portion 20 is disposed in the observation optical path A outside the microscope main unit 10 and is optically connected to the camera adaptor 17. The image-acquisition portion 20 is provided with an image-acquisition device 21, a pre-processing portion 22, an amplifying portion 23, and an A/D (analog-digital) converting portion 24.

The image-acquisition device 21 is a CCD image sensor, a CMOS image sensor, or the like, and an image-acquisition surface 21a thereof is disposed on the imaging surface for the observation image. The image-acquisition device 21 photoelectrically converts the light incident thereon from the microscope main unit 10 and outputs the generated electrical signals to the pre-processing portion 22.

FIG. 4 shows the arrangement of color filters provided in the image-acquisition surface 21a of the image-acquisition device 21. As shown in FIG. 4, the image-acquisition device 21 is an RGB color image-acquisition device. Specifically, R (red), Gr (green), Gb (green), and B (blue) color filters placed in the Bayer arrangement are provided in the image-acquisition surface 21a. One of the R, Gr, Gb, and B color filters is provided in the individual photo-reception devices that are two-dimensionally arranged on the image-acquisition surface 21a. Therefore, image data include four types of pixels, namely, R-pixels having R luminance signals, Gr-pixels having Gr luminance signals, Gb-pixels having Gb luminance signals, and B-pixels having B luminance signals.

Note that the image-acquisition device 21 may be a monochromatic image-acquisition device instead of a color image-acquisition device.

The pre-processing portion 22 performs sampling of the electrical signals input from the image-acquisition device 21 by applying correlative double sampling (CDS) or the like, and outputs the electrical signals to which sampling has been applied to the amplifying portion 23.

The amplifying portion 23 amplifies the electronic signals input from the pre-processing portion 22 and outputs them to the A/D converting portion 24.

The A/D converting portion 24 applies quantization to the electrical signals input from the amplifying portion 23 to generate the image data of the observation image of the specimens S, and outputs the generated image data.

The image processing portion 30 is provided with a background identifying portion 31, a luminance-distribution estimating portion (calibration-data generating portion) 32, a correction-value calculating portion (calibration-data generating portion) 33, and a shading correcting portion 34. The image processing portion 30 is, for example, a computer provided with a central processing unit (CPU), a main storage device, and an auxiliary storage device. The auxiliary storage device is a non-transitory computer-readable storage medium storing an image-processing program. The CPU reads out the image-processing program to the main storage device from the auxiliary storage device and executes the image-processing program, thus realizing the functions of the individual portions 31, 32, 33, and 34, described later. Alternatively, the image processing portion 30 may be provided with special hardware, such as an ASIC, that executes the processing performed by the individual portions 31, 32, 33, and 34.

In an image-acquisition region of the image data output from the A/D converting portion 24, the background identifying portion 31 identifies regions having a feature quantity the same as or similar to that of a specified region specified by means of the input portion 50, described later. Specifically, as the feature quantity of the specified region, the background identifying portion 31 calculates a background parameter $P_{BG}$, which is a value representing the hue of the specified region, from the signal values (luminances) of the individual pixels in the specified region by using Expression (1) below. In Expression (1), $R_{AVE}$, $Gr_{AVE}$, $Gb_{AVE}$, and $B_{AVE}$ are average values of the luminance signal levels of the individual colors in the specified region.

{Eq. 1}

$$P_{BG} = \left( \frac{2 \times R_{AVE}}{Gr_{AVE} + Gb_{AVE}}, \frac{2 \times B_{AVE}}{Gr_{AVE} + Gb_{AVE}} \right) \quad (1)$$

Figure 3:
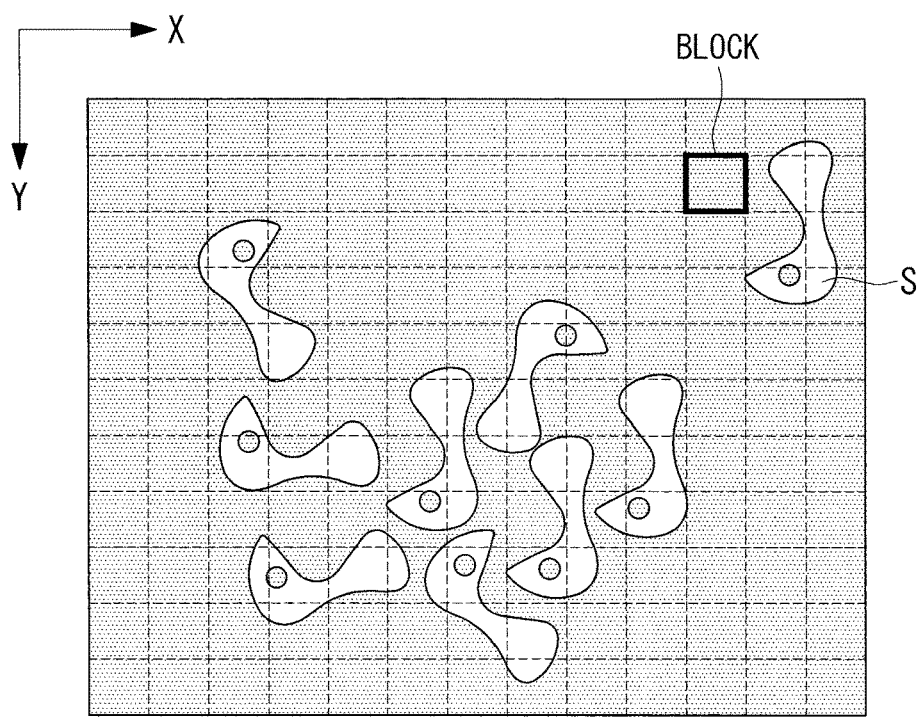
FIG. 3 shows an image divided into blocks of size of M pixels×N pixels by a background identifying portion of the microscope system in FIG. 1.

Next, the background identifying portion 31 identifies, in the image-acquisition region of the image data, regions having a background parameter $P_{BG\_Block}$ the same as or similar to that of the specified region. Specifically, as shown in FIG. 3, the background identifying portion 31 divides the image-acquisition region of the image data into blocks so that the size of one block is M pixels×N pixels, and calculates the background parameter $P_{BG\_Block}$ of each block by using Expression (2) below. M and N are integers equal to or greater than 2.

{Eq. 2}

$$P_{BG\_Block} = \left( \frac{2 \times R_{AVE}}{Gr_{AVE} + Gb_{AVE}}, \frac{2 \times B_{AVE}}{Gr_{AVE} + Gb_{AVE}} \right) \quad (2)$$

Figure 5:
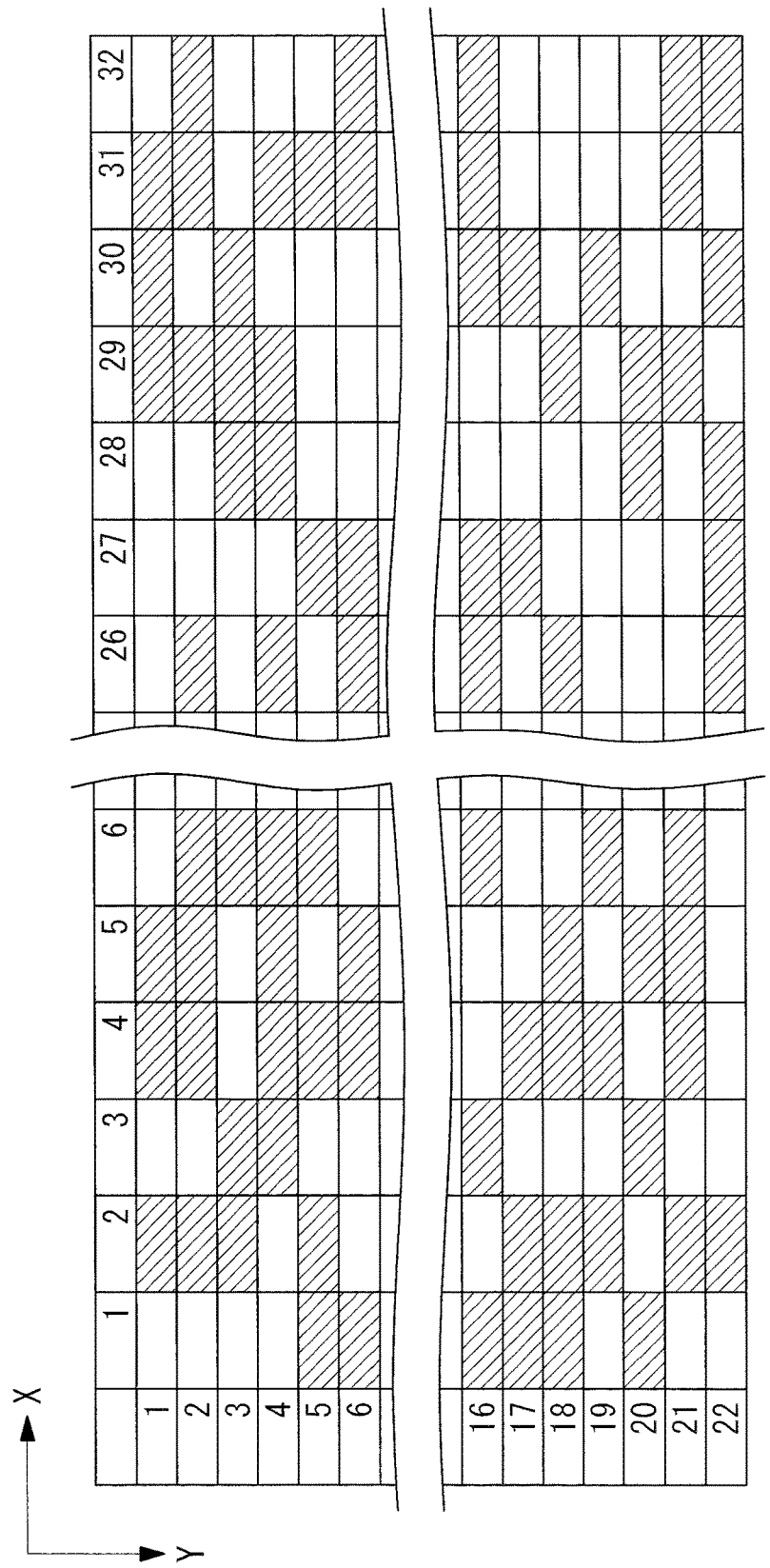
FIG. 5 is a diagram showing example background-region data generated by the background identifying portion of the microscope system in FIG. 1.

Next, the background identifying portion 31 compares the background parameter $P_{BG}$ of the specified region and the background parameter $P_{BG\_Block}$ of each block, and judges that the block in question is a background region when the $P_{BG\_Block}$ falls within $P_{BG} \pm \Delta\%$ ($\Delta$ is a constant). By doing so, background regions including the specified region are determined in the image-acquisition region of the image data. As shown in FIG. 5, by storing X-coordinates and Y-coordinates of the individual pixels of the specified region and the blocks that have been judged to be the background regions in association with the luminance signal levels thereof, the background identifying portion 31 generates background-region data in which only the pixels of the background regions in the image data are identified. In the background-region data in FIG. 5, pixels shown with hatching are the pixels of the background regions, and the background-region data include the luminance signal levels of only the pixels of the background regions. In FIG. 5, the upper left corner of the background-region data is the origin of the coordinates, the direction from left to right is the positive direction on the X-axis, and the direction from top to bottom is the positive direction on the Y-axis.

Note that the background parameters $P_{BG}$ and $P_{BG\_Block}$ defined by Expressions (1) and (2) are mere examples of the feature quantities, and other values that clearly differ between the background regions and the specimen regions, for example, saturation, brightness, or hue defined by expressions other than Expressions (1) and (2) may be used as the feature quantities.

The luminance-distribution estimating portion 32 uses the background-region data generated by the background identifying portion 31 to estimate distributions of the luminance signal levels for the entire image-acquisition region for the individual colors (R, Gr, Gb, and B).

For example, in the case of the distribution of the luminance signal levels of the R-pixels, the R-pixels are arranged in odd rows and odd columns in the Bayer arrangement.

Here, although an image-acquisition device in which R-pixels are arranged in odd rows and odd columns in the Bayer arrangement is employed in this embodiment, for example, an image-acquisition device in which R-pixels are arranged in even rows and even columns may be employed.

Figure 6:
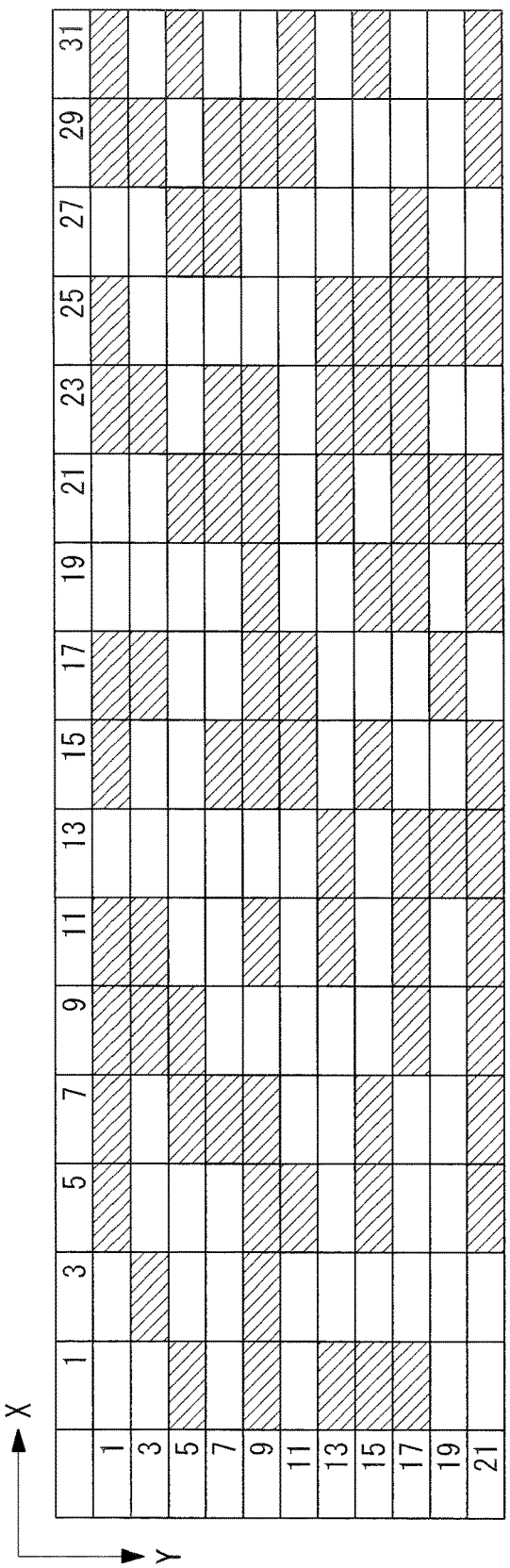
FIG. 6 is a diagram showing data in which only R-pixels are identified in the background-region data in FIG. 5.

As shown in FIG. 6, the luminance-distribution estimating portion 32 obtains data in which only the R-pixels are identified in the background-region data in FIG. 5. The luminance-distribution estimating portion 32 interpolates the luminance signal levels of pixels of the specimen regions for which information about the luminance signal levels does not exist in the R-pixel data on the basis of the luminance signal levels of pixels around those pixels of the specimen regions.

A method of interpolating the luminance signal levels by using a linear interpolation will be described as an example.

Figure 7:
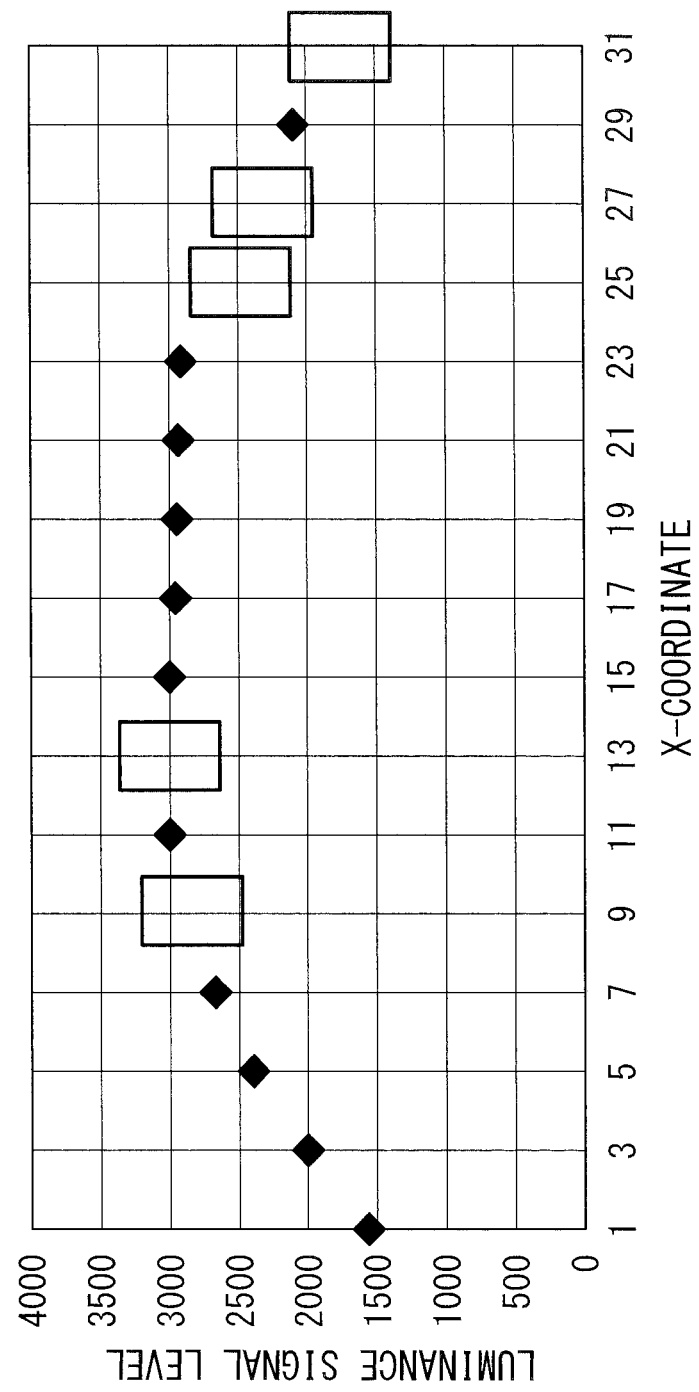
FIG. 7 is a graph showing the distribution of luminance signal levels obtained from the data in FIG. 6.

FIG. 7 shows the distribution of the luminance signal levels in a line at Y=9 in the background-region data in FIG. 6. In the distribution in FIG. 7, information about the luminance signal levels does not exist for pixels at X=9, 13, 25, 27, and 31. The luminance-distribution estimating portion 32 calculates the luminance signal levels $I_1$ for these pixels by using Expression (3) below. In Expression (3), $x_1$ is the X-coordinate of a pixel in a specimen region, $x_0$ and $x_2$ are the X-coordinates of pixels of two background regions that are adjacent to $x_1$ in the X-axis direction, and $I_0$ and $I_2$ are the luminance signal levels of the pixels in the two background regions at $x_0$ and $x_2$.

{Eq. 3}

$$I_1 = \frac{I_0 - I_2}{x_0 - x_2} \times x_1 + \frac{x_2 \times I_0 - x_0 \times I_2}{x_2 - x_0} \quad (3)$$

Here, in the case in which pixels of the background regions do not exist on both sides of a pixel of a specimen region, the luminance-distribution estimating portion 32 calculates the luminance signal levels $I_1$ for the individual pixels of the specimen region by using Expression (4) below. In Expression (4), $x_2$ and $x_3$ are the X-coordinates of the pixels of the two background regions positioned on one side of the two X-directions with respect to the pixel of the specimen region, and $I_0$ and $I_2$ are the luminance signal levels of the pixels of the two background regions at $x_2$ and $x_3$.

{Eq. 4}

$$I_1 = \frac{I_2 - I_3}{x_2 - x_3} \times x_1 + \frac{x_3 \times I_2 - x_2 \times I_3}{x_3 - x_2} \quad (4)$$

Figure 8:
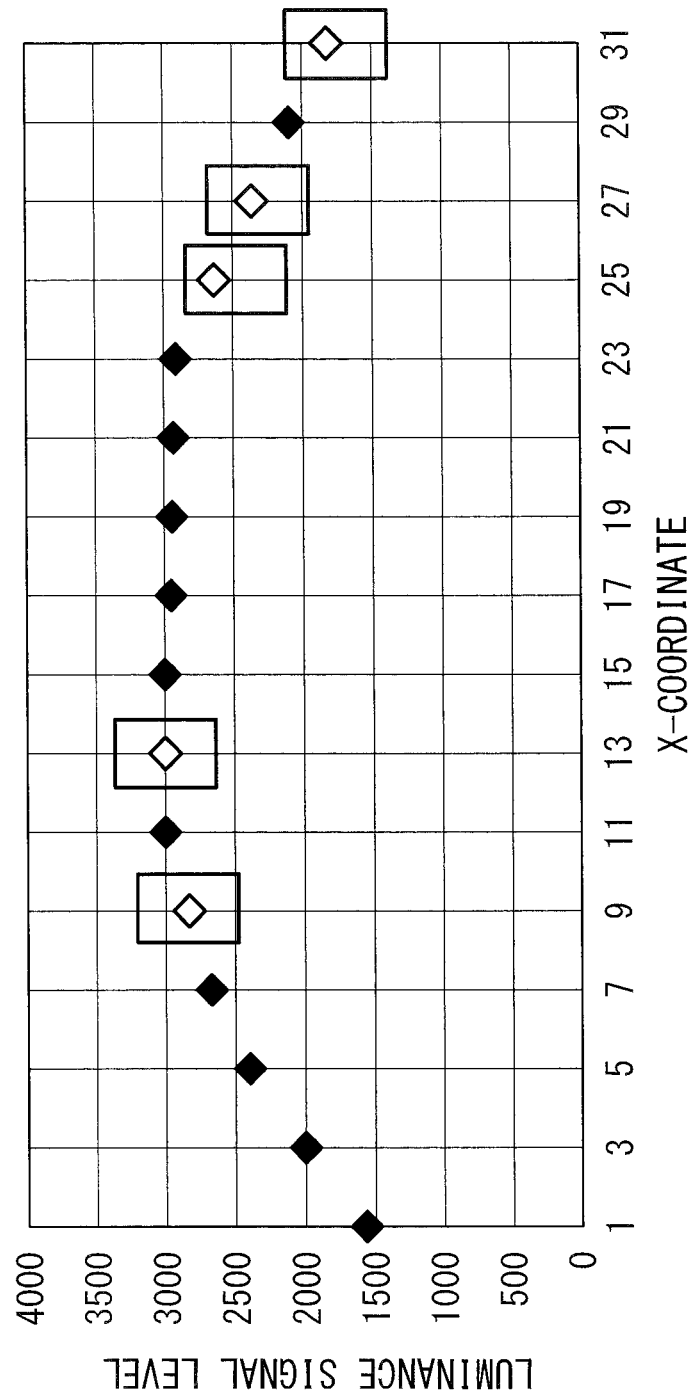
FIG. 8 is the graph in FIG. 7 in which luminance signal levels of pixels of specimen regions are interpolated.

As shown in FIG. 8, the luminance signal levels of the pixels of the specimen regions are interpolated by using this method. By using the same method, the luminance-distribution estimating portion 32 interpolates the luminance signal levels of the pixels of the specimens S with regard to all lines in the R-pixel data. Here, the interpolated luminance signal levels of the pixels of the specimen regions are background signal levels that have not originated from the specimens S, and the distribution of the luminance signal levels estimated by the luminance-distribution estimating portion 32 (estimated luminance distribution) is the distribution of the background signal levels of the R-pixels in the entire image-acquisition region. This estimated luminance distribution represents irregularities of brightness and color, that is, shading, caused by intensity irregularity of the illumination light radiated onto the specimens S from the light source 11, non-uniformity of properties of the optical system of the microscope main unit 10, sensitivity irregularity of the image-acquisition device 21, or the like.

By using the same methods as for the R-pixels, the luminance-distribution estimating portion 32 also obtains the estimated luminance distributions for the entire image-acquisition region of the image date for the Gr-pixels, the Gb-pixels, and the B-pixels.

Note that the interpolation of the luminance signal levels of the pixels of the specimen regions may be performed by using the luminance signal levels of the pixels of background regions that are adjacent thereto in the Y-axis directions instead of the X-axis directions.

In addition, an interpolation method other than the linear interpolation, for example, Lagrange interpolation, spline interpolation, or least-squares method, may be employed. In addition, interpolation values may be calculated by weighting the luminance signal levels of the pixels around the pixels to be interpolated.

Figure 9:
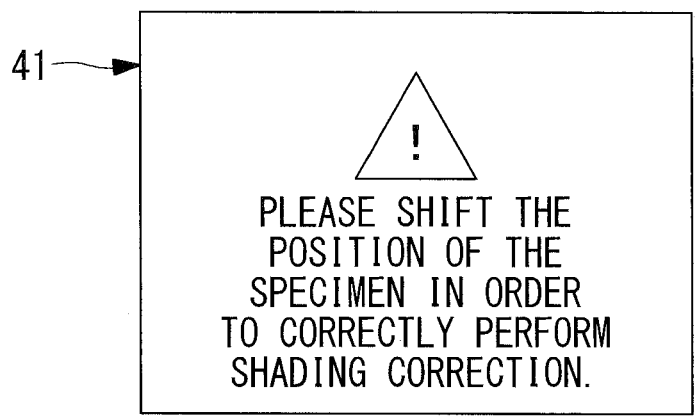
FIG. 9 is an example indication with which an instruction for re-acquisition of image data is issued.

The luminance-distribution estimating portion 32 judges the validity of the estimated luminance distributions. Specifically, in the case in which the number of pixels of the background regions is equal to or greater than a predetermined proportion of the number of all pixels in the image-acquisition area, the correction-value calculating portion 33 judges that the estimated luminance distributions are valid. On the other hand, in the case in which the number of pixels of the background regions is less than the predetermined proportion of the number of all pixels in the image-acquisition area, the correction-value calculating portion 33 judges that the estimated luminance distributions are invalid because estimation precision is unsatisfactory, and displays an indication 41 on the display portion 40, with which an instruction for re-acquisition of the image data, after changing the image-acquisition area, is issued, as shown in FIG. 9.

Other methods may be used to judge the validity of the estimated luminance distributions. For example, the case in which the deviation of error of the luminance signal levels in FIG. 7 is equal to or less than a predetermined threshold may be judged to be valid, and the case in which the deviation of error is greater than the predetermined threshold may be judged to be invalid.

The correction-value calculating portion 33 executes the following calculation of correction values only when the estimated luminance distributions are judged by the luminance-distribution estimating portion 32 to be valid. The correction-value calculating portion 33 calculates correction values for the luminance signals of the individual pixels so that the luminance signal levels in the estimated luminance distributions obtained by the luminance-distribution estimating portion 32 become uniform.

Specifically, the correction-value calculating portion 33 calculates shading correction values $P_{SHC}$ of the pixels at coordinates (x, y) by using Expression (5) on the basis of the estimated luminance distributions of the individual colors. In Expression (5), $I_{REF}$ is a maximum value of the luminance signal levels in the estimated luminance distribution of the R-pixels, the Gr-pixels, the Gb-pixels, or the B-pixels. An average value, an intermediate value, a modal value, or the like may be used instead of the maximum value. $I_{DTB(x,y)}$ is a luminance signal level of a pixel at coordinates (x, y).

{Eq. 5}

$$P_{SHC(x,y)} = \frac{I_{REF}}{I_{DTB(x,y)}} \quad (5)$$

The correction-value calculating portion 33 generates calibration data in which the calculated shading correction value $P_{SHC}$ is associated with the X-coordinate and the Y-coordinate of that pixel. The generated calibration data are stored in, for example, the auxiliary storage device, and shading correction may be applied to image data acquired in the past or a live image by using the stored calibration data.

The shading correcting portion 34 obtains corrected image data by correcting the luminance signal levels of the individual pixels in the image data in accordance with Expression (6) below by using the calibration data generated by the correction-value calculating portion 33. In Expression (6), $I_{SHC(x,y)}$ is the corrected luminance signal level of a pixel at coordinates (x ,y), and $I_{(x,y)}$ is the luminance signal level of the pixel at the coordinates (x, y) before the correction. The shading correcting portion 34 outputs the corrected image data to the display portion 40 so as to be displayed thereon.

{Eq. 6}

$$I_{SHC(x,y)} = \frac{I_{(x,y)}}{P_{SHC(x,y)}} \quad (6)$$

In addition to the above-described background identifying portion 31, luminance-distribution estimating portion 32, correction-value calculating portion 33, and shading correcting portion 34, the image processing portion 30 may have functions for executing, on the image data, various type of processing such as digital processing or the like, including demosaicing, color matrix conversion, contrast processing, sharpening, or the like. Such various types of processing may be executed before processing by the background identifying portion 31 or after the processing by the shading correcting portion 34.

The input portion (background specifying portion) 50 is provided with an input device (not shown) like a mouse so that an operator can specify an arbitrary region in an image displayed on the display portion 40 as a specified region by using the input device.

Figure 10:
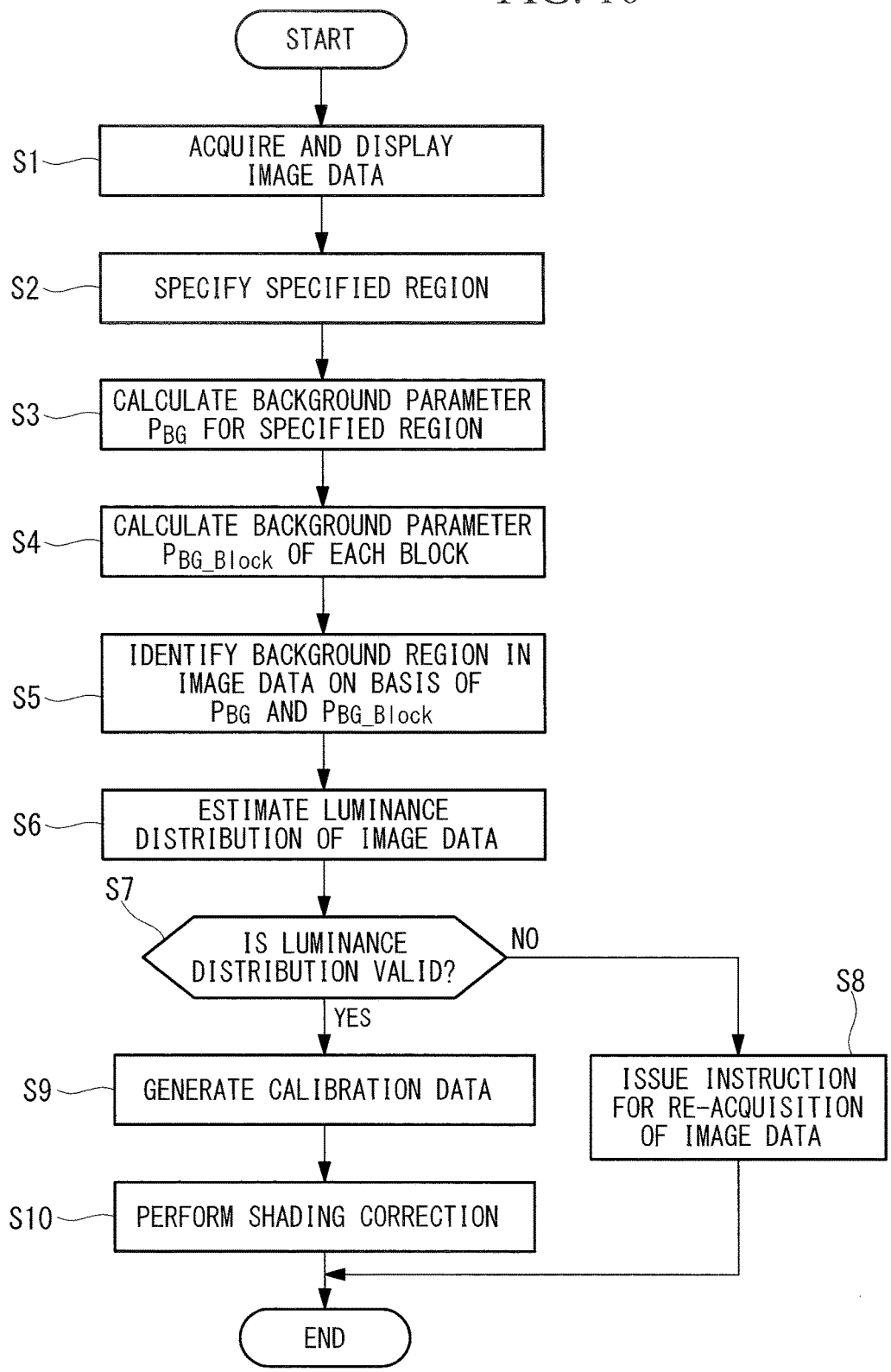
FIG. 10 is a flowchart showing the operation of the microscope system in FIG. 1.

Next, the operation of the thus-configured microscope system 1 will be described with reference to FIG. 10.

When the image-acquisition portion 20 acquires image data of an observation image of the specimens S formed by the microscope main unit 10, the image is displayed on the display portion 40 (step S1). The operator specifies at least one location in the background region of the image displayed on the display portion 40 as a specified region by manipulating the input device of the input portion 50 (step S2). Once the specified region is specified in step S2, the image processing portion 30 executes the following processing from steps S3 to S10 by using the image data received from the image-acquisition portion 20.

In the background identifying portion 31, the background parameter $P_{BG}$ of the specified region is calculated (step S3), and the background parameters $P_{BG\_Block}$ of the individual blocks of regions other than the specified region are calculated (step S4). Next, in the background identifying portion 31, blocks having a background parameter $P_{BG\_Block}$ the same as or similar to the background parameter $P_{BG}$ are selected as the background regions (step S5). Through the steps S3 to S5 described above, the specimen regions and the background regions in the image are distinguished on the basis of the background parameters $P_{BG}$ and $P_{BG\_Block}$, only the background regions are automatically identified, and the background-region data representing the distributions of the luminance signal levels of the background regions are generated.

Next, in the luminance-distribution estimating portion 32, the background signal levels of the pixels in the specimen regions are interpolated on the basis of the background-region data, and thus, the estimated luminance distributions for the entire image-acquisition region are obtained (step S6). Subsequently, in the luminance-distribution estimating portion 32, it is judged whether or not the estimated luminance distributions are valid for performing shading correction (step S7). In the case in which the estimated luminance distributions are judged to be invalid ("NO" in step S7), a notification is issued prompting the operator to re-acquire the image data (step S8). On the other hand, in the case in which the estimated luminance distributions are judged to be valid ("YES" in step S7), the procedure moves on to the next processing step by the correction-value calculating portion 33 (step S9).

In the correction-value calculating portion 33, the shading correction values $P_{SHC}$ of the individual pixels are calculated by using Expression (5) on the basis of the estimated luminance distributions obtained by the luminance-distribution estimating portion 32, and thus, the calibration data are generated (step S9). Next, in the shading correcting portion 34, the luminance signal levels of the individual pixels are corrected by using the calibration data generated by the correction-value calculating portion 33 (step S10). By doing so, corrected image data in which shading, in terms of both color and brightness, is removed so that the background signal levels are made constant over the entire image-acquisition region are obtained.

As described above, with the microscope system 1 according to this embodiment, the background regions can be identified in the entire image on the basis of the background parameter $P_{BG}$ of the specified region specified in the background region by the operator, and the background signal levels of the entire image can be estimated on the basis of the distributions of the luminance signal levels of the identified background region. Accordingly, there is an advantage in that shading in the image can be corrected in a simple and highly precise manner without having to remove the specimens S from the viewing field of the microscope main unit 10 or having to prepare a special correction specimen for the purpose of shading correction.

Furthermore, with the microscope system 1 according to this embodiment, there is an advantage in that the background region can be identified even with a simple manipulation with which the operator specifies one location instead of specifying multiple locations as specified regions.

(Modification of the First Embodiment)

Next, a microscope system 1' according to a modification of the first embodiment will be described with reference to FIGS. 11 to 16.

The microscope system 1' according to this modification differs from the above-described microscope system 1 in that imaging conditions can be changed, and calibration data are acquired and stored for each imaging condition.

Figure 11:
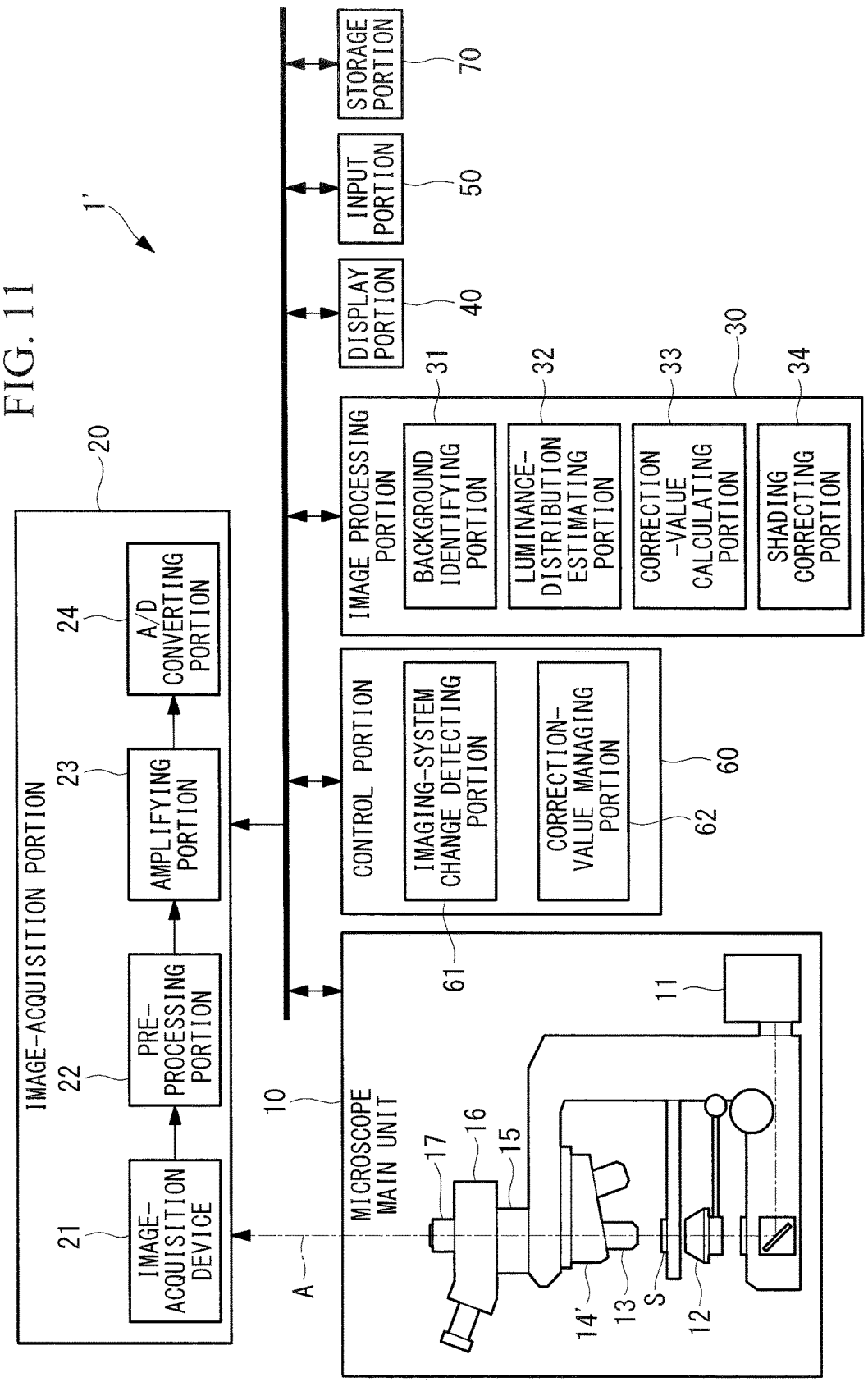
FIG. 11 is an overall configuration diagram of a modification of the microscope system in FIG. 1.

As shown in FIG. 11, the microscope system 1' according to this modification is additionally provided with a control portion 60 and a storage portion 70. The microscope main unit 10, the image-acquisition portion 20, the image processing portion 30, the display portion 40, the input portion 50, the control portion 60, and the storage portion 70 are connected via a bus so as to allow them to communicate with each other.

Figure 12:
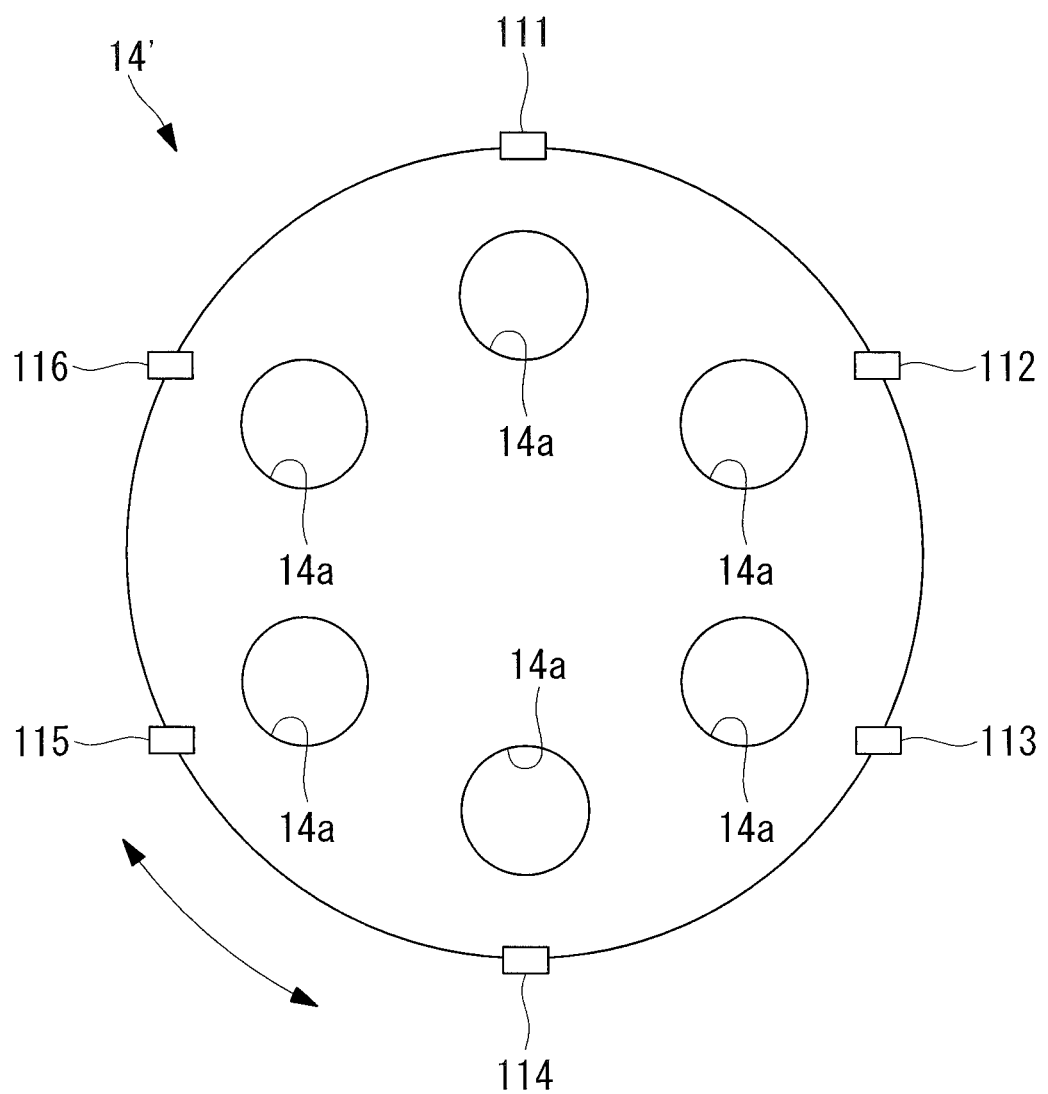
FIG. 12 is a diagram showing a revolver provided in a microscope main unit of the microscope system in FIG. 11.

Furthermore, the microscope system 1' is provided with a revolver 14' shown in FIG. 12 instead of the revolver 14. The revolver 14' has a plurality of holes 14a to which the objective lenses 13 are mounted, and are configured so that one of the holes 14a is placed in the observation optical path A. The portions of the revolver 14' other than the holes 14a are configured so as to block light.

Hole identification tags 111 to 116 are attached to the vicinities of the individual holes 14a of the revolver 14'. The individual hole identification tags 111 to 116 store identification codes that serve as hole identification information for identifying the holes 14a corresponding thereto. The revolver 14' acquires the identification code that corresponds to the hole 14a placed in the observation optical path A from the hole identification tags 111 to 116, and transmits the acquired identification code to an imaging-system change detecting portion 61 in the control portion 60.

Figure 13:
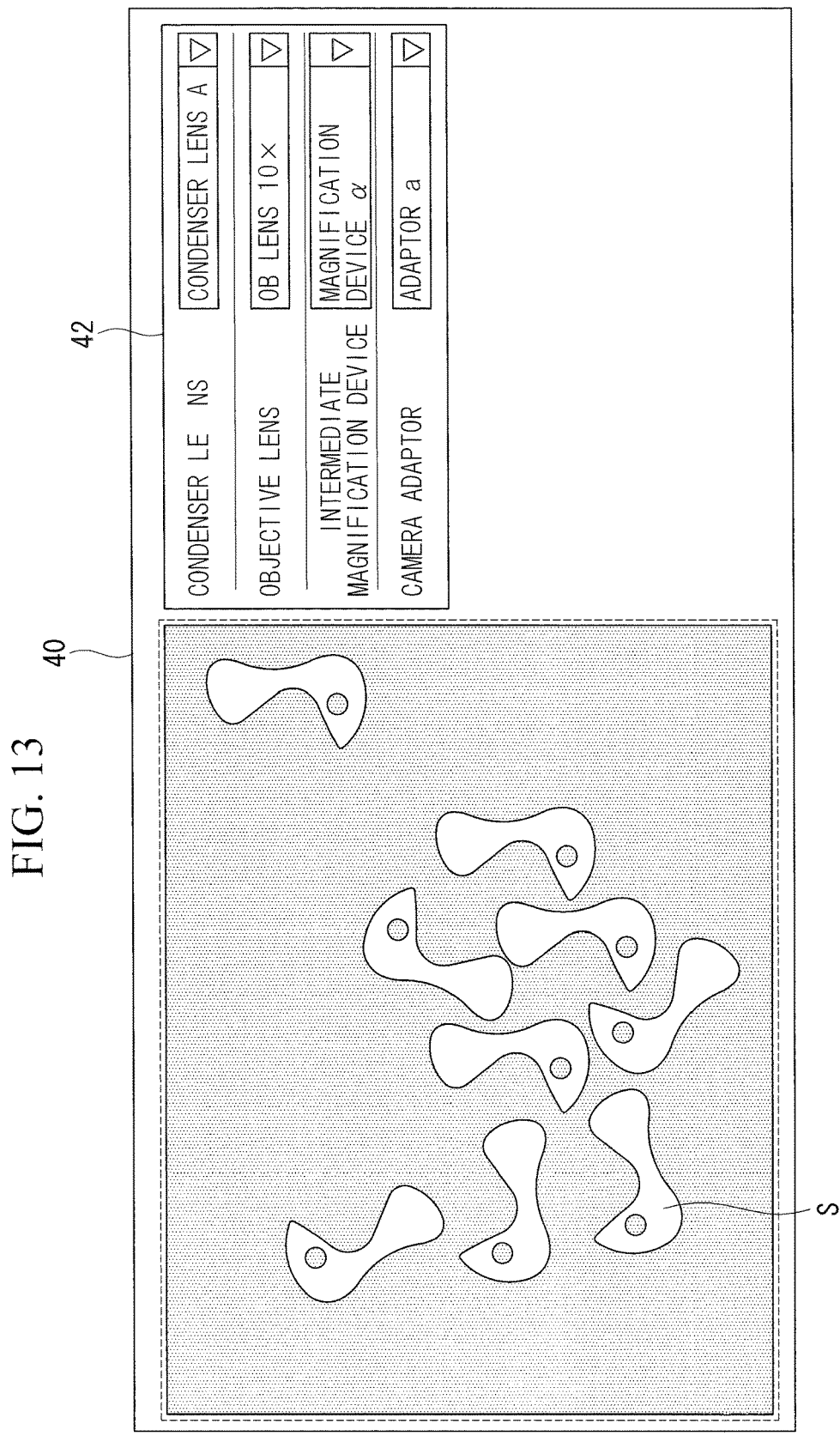
FIG. 13 is a diagram showing examples of imaging-condition setting fields displayed on a display portion of the microscope system in FIG. 11.

As shown in FIG. 13, in this modification, the condenser lenses 12, the intermediate magnification devices 15, and the camera adaptors 17 as well as the objective lenses 13, which are imaging systems, can also be changed. Imaging-condition setting fields 42 for setting the imaging systems to be used are displayed on the display portion 40. The imaging-condition setting fields 42 are configured so that, for example, the types of the individual imaging systems can be selected from pull-down menus by using the input portion 50. The operator sets the types of the individual optical systems as the imaging conditions by selecting the types of the individual imaging systems by using the input portion 50. Information about the set imaging conditions is transmitted to the imaging-system change detecting portion 61 in the control portion 60 from the display portion 40.

The control portion 60 is provided with the imaging-system change detecting portion 61 and a correction-value managing portion 62.

The imaging-system change detecting portion 61 detects changes in the imaging systems on the basis of the identification codes received from the revolver 14' or on the basis of the information about the imaging-condition setting received from the display portion 40. When a change in the imaging systems is detected, the imaging-system change detecting portion 61 notifies the correction-value managing portion 62 about the change.

Figure 15:
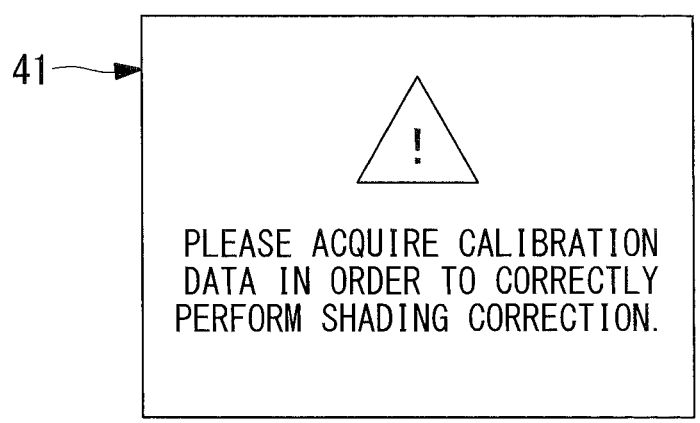
FIG. 15 is a diagram showing an example indication with which an instruction for acquisition of calibration data is issued.

When the notification about a change in the imaging systems is received from the imaging-system change detecting portion 61, the correction-value managing portion 62 judges whether or not it is necessary to acquire calibration data. In other words, in the case in which calibration data associated with imaging conditions that are the same as the most recent imaging conditions are stored in a calibration data table (described later) in the storage portion 70, the correction-value managing portion 62 sets those calibration data in the shading correcting portion 34. On the other hand, in the case in which calibration data associated with imaging conditions that are the same as the most recent imaging conditions are not yet stored in the calibration data table in the storage portion 70, the correction-value managing portion 62 displays, on the display portion 40, an indication 41 with which an instruction for calibration-data acquisition is issued, as shown in FIG. 15.

As shown in FIG. 14, the storage portion 70 stores the calibration data table in which the imaging conditions (that is, combinations of the types of the objective lenses 13, the condenser lenses 12, the intermediate magnification devices 15 and the camera adaptors 17) are associated with the calibration data. Each time calibration data are generated by the correction-value calculating portion 33, the generated calibration data are stored in the calibration data table in association with the imaging conditions used at that time.

The control portion 60 and the storage portion 70 are constituted of, for example, computers, as with the image processing portion 30.

Other configurations of the microscope system 1' of this modification are the same as those of the microscope system 1.

Figure 16:
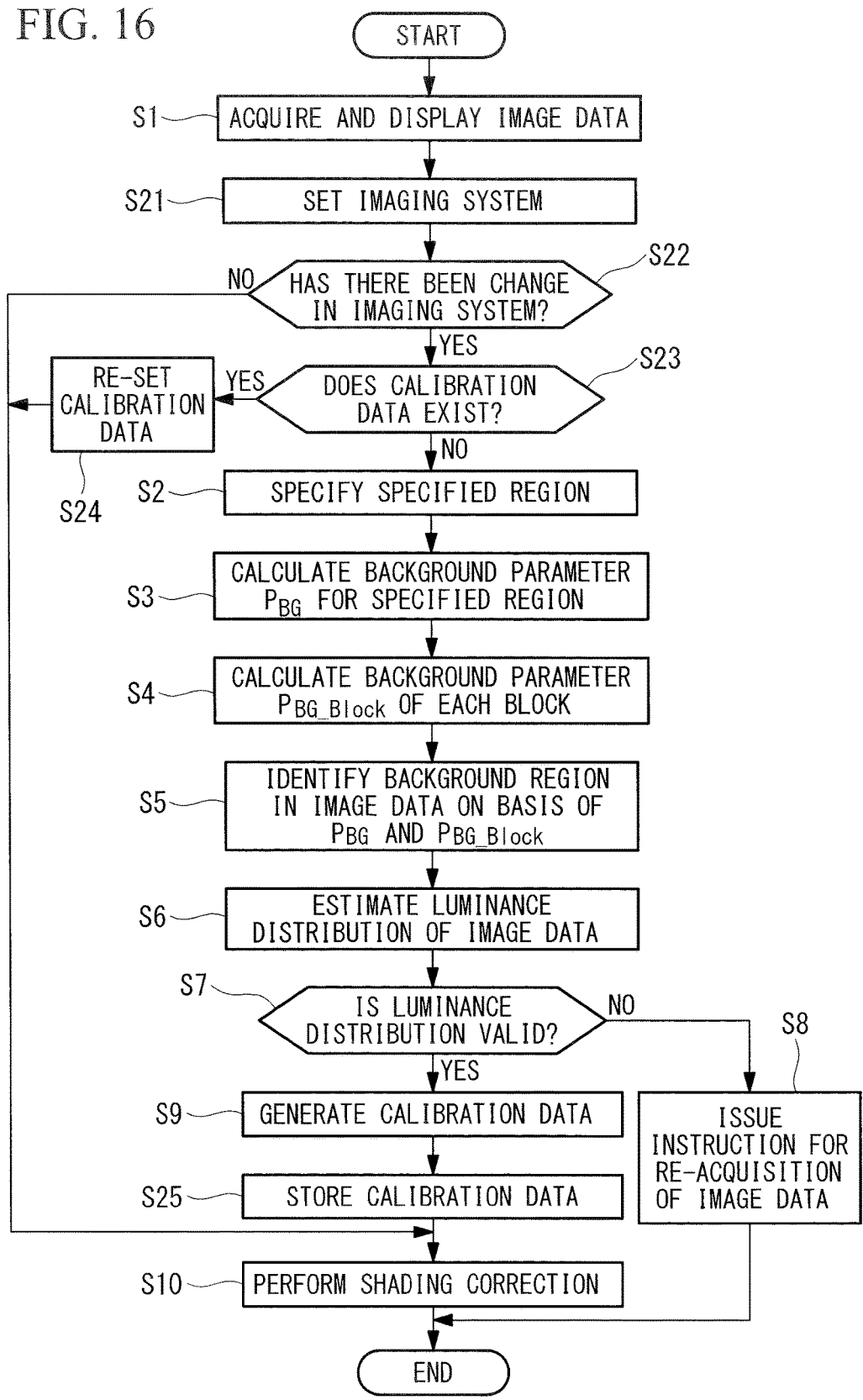
FIG. 16 is a flowchart showing the operation of the microscope system in FIG. 11.

Next, the operation of the thus-configured microscope system 1' will be described with reference to FIG. 16.

When the image-acquisition portion 20 acquires image data of an observation image of the specimens S formed by the microscope main unit 10, the image is displayed on the display portion 40 (step S1). The operator sets the imaging conditions used to acquire the image data by manipulating the input device of the input portion 50 (step S21).

Here, although the imaging conditions used to acquire the image data in step S21 are set after acquiring the image data in step S1, the order of these two steps S1 and S21 may be reversed. In other words, after setting the imaging conditions to be used to acquire the image data in step S21, the image data may be acquired in step S1 by using these set imaging conditions.

Next, the imaging-system change detecting portion 61 judges whether or not there have been changes in the imaging conditions (step S22). In the case in which imaging conditions that are the same as the imaging conditions used immediately therebefore are set and the objective lenses 13 are not manually changed by the operator, it is judged that the imaging conditions have not been changed ("NO" in step S22). In this case, the calibration data corresponding to the current imaging conditions are already set in the shading correcting portion 34. Therefore, the shading correcting portion 34 executes shading correction by using the calibration data that have already been set (step S10).

On the other hand, in the case in which imaging conditions that are different from the imaging conditions used immediately therebefore are set in step S21 or the objective lenses 13 have been manually changed by the operator, the changes in the imaging conditions are detected by the imaging-system change detecting portion 61 ("YES" in step 22), and the changes in the imaging conditions are notified to the correction-value managing portion 62. The correction-value managing portion 62 checks whether or not calibration data corresponding to the current imaging conditions exist in the calibration data table in the storage portion 70 (step S23). In the case in which the calibration data that correspond to the current imaging conditions exist ("YES" in step S23), those calibration data are set in the shading correcting portion 34 (step S24). By doing so, the shading correcting portion 34 executes shading correction by using the calibration data corresponding to the changed imaging conditions (step S10).

In the case in which calibration data that correspond to the current imaging conditions do not exist ("NO" in step S23), the correction-value managing portion 62 displays the indication 41 on the display portion 40, with which an instruction for acquisition of the calibration data is issued. When the operator specifies a specified region in accordance with the indication 41 that has appeared on the display portion 40 (step S2), the above-described steps S3 to S9 are executed, and thus, new calibration data are acquired. The new calibration data are stored in the calibration data table in the storage portion 70 in association with the current imaging conditions (step S25). The shading correcting portion 34 executes shading correction by using the new calibration data (step S10).

As described above, with the microscope system 1' according to this modification, the calibration data are accumulated in association with imaging conditions. Because shading that occurs in the image data depends on the imaging conditions, the same calibration data can be used for shading correction of the image data acquired by using the same imaging conditions. Therefore, by storing the calibration data that have already been acquired in the calibration data table, it is possible to eliminate the need for re-acquisition of the calibration data for the same imaging conditions. Furthermore, each time the imaging conditions are changed, it is checked whether or not the calibration data corresponding to the changed imaging conditions have already been acquired, and calibration data are newly acquired if the calibration data have not been acquired. By doing so, it is possible to reliably apply shading correction to the image data.

{Second Embodiment}

Next, a microscope system 2 according to a second embodiment of the present invention will be described with reference to FIGS. 17 to 19.

Figure 17:
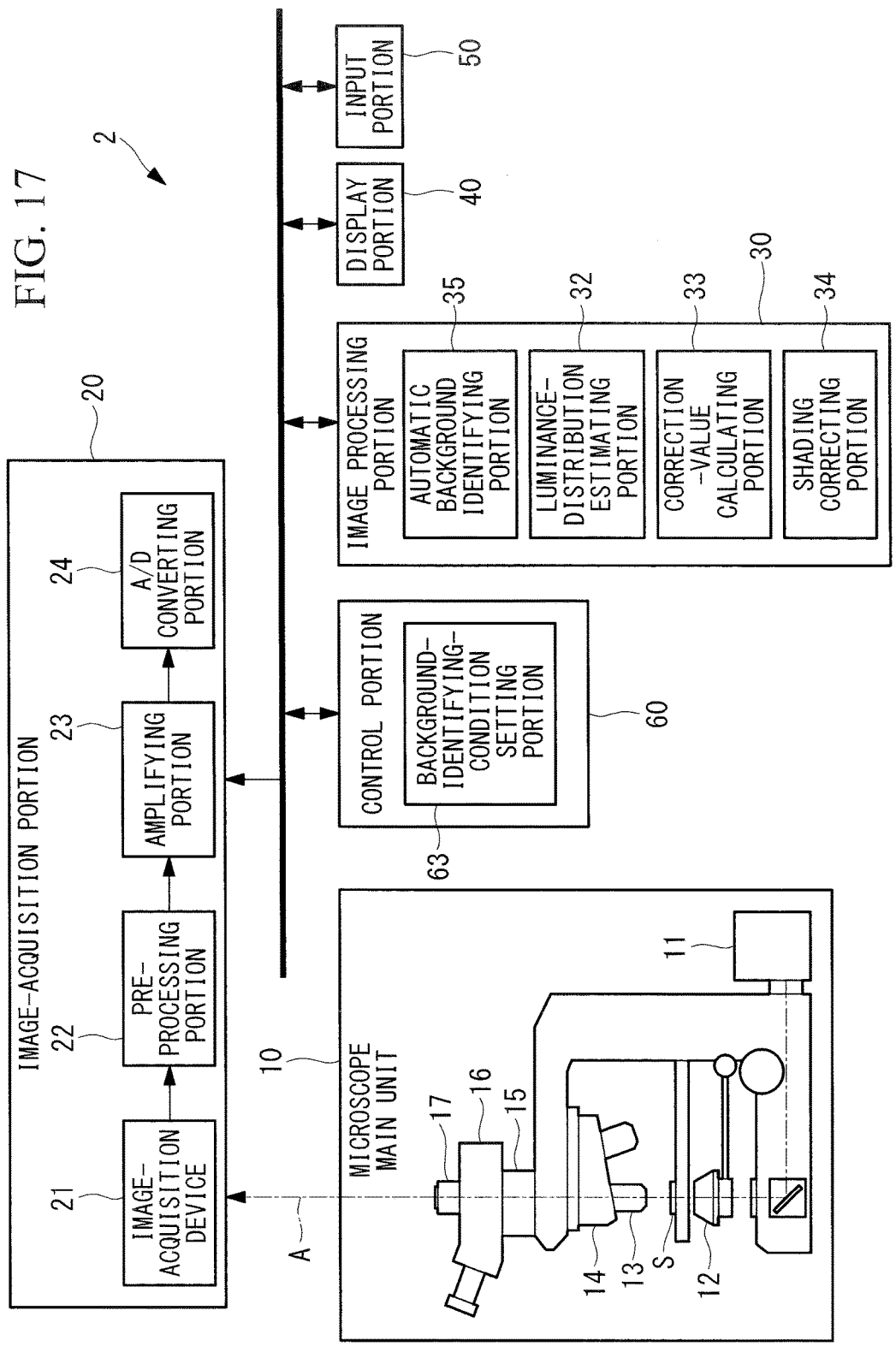
FIG. 17 is an overall configuration diagram of a microscope system according to a second embodiment of the present invention.

As shown in FIG. 17, the microscope system 2 according to this embodiment differs from the microscope system 1 in terms of the image processing portion 30 and the control portion 60, and is configured so that the background regions are identified on the basis of an observation method specified by the operator.

Therefore, in this embodiment, the image processing portion 30 and the control portion 60 will mainly be described; other configurations in common with those of the first embodiment will be given the same reference signs, and descriptions thereof will be omitted.

The image processing portion 30 is provided with an automatic background identifying portion 35 instead of the background identifying portion 31. The automatic background identifying portion 35 identifies the background region in the image data in accordance with background identifying conditions (described later) set by a background-identifying-condition setting portion 63. Specifically, as with the background identifying portion 31, the automatic background identifying portion 35 divides the entire region of the image data into blocks of size of M pixels×N pixels, calculates the background parameters $P_{BG\_Block}$ of the individual blocks by using Expression (2), and identifies a block having a background parameter $P_{BG\_Block}$ that satisfies the background identifying conditions as the background region.

Note that, in this embodiment also, $P_{BG\_Block}$ defined by Expression (2) is a mere example of the background parameter, and a value other than $P_{BG\_Block}$ may be used as the background parameter. In addition, other values that clearly differ between the background regions and the specimen regions, for example, specific hue, saturation, or brightness, may be used as a feature quantity instead of the background parameter $P_{BG\_Block}$.

Figure 18:
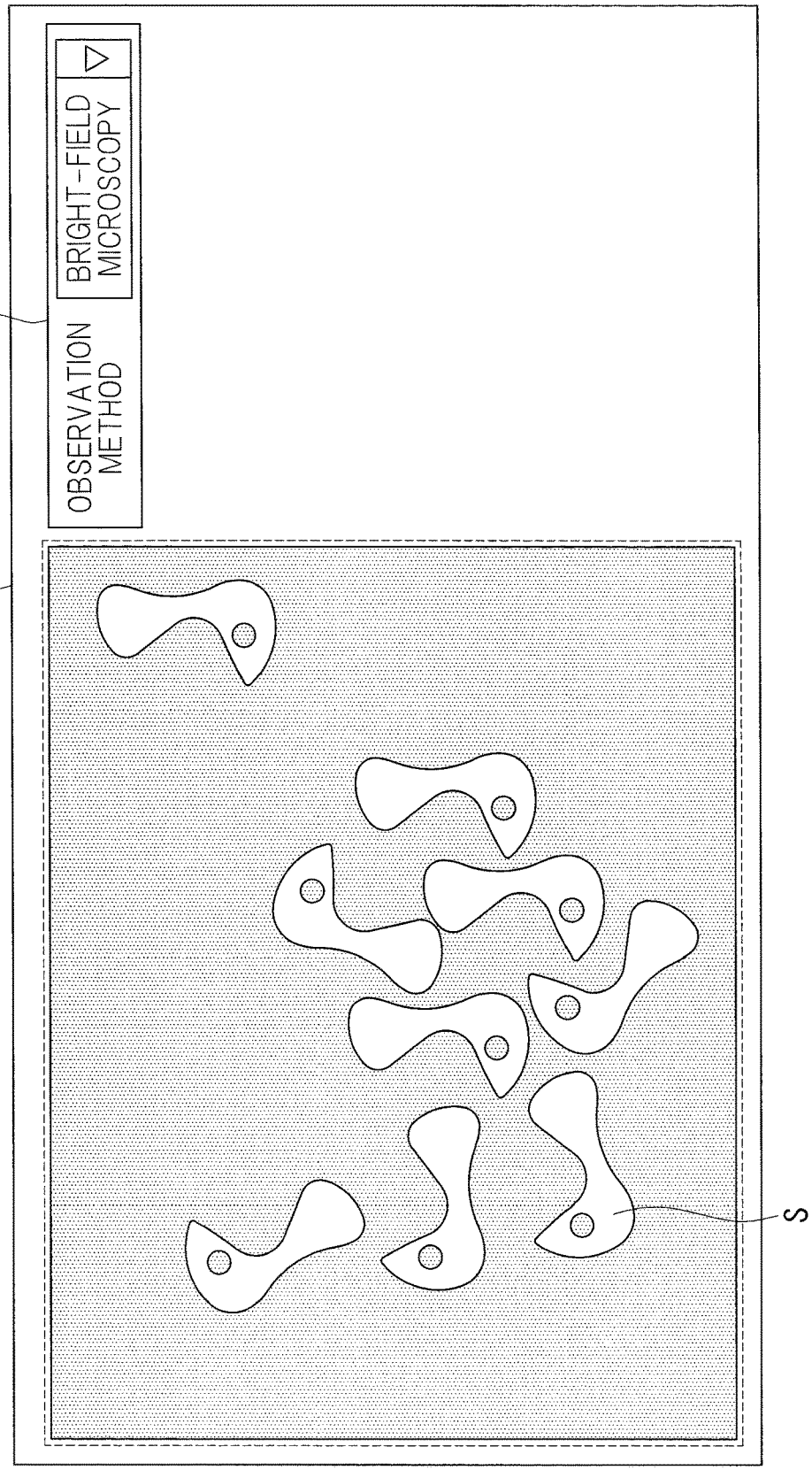
FIG. 18 is a diagram showing an example of an observation-method setting field displayed on a display portion of the microscope system in FIG. 17.

As shown in FIG. 18, an observation-method setting field for setting the observation method is displayed on the display portion 40. The observation method refers to a microscope observation method including bright-field microscopy, dark-field microscopy, differential interference contrast microscopy, phase contrast microscopy, fluoroscopy, dispersion staining microscopy, or the like. The observation-method setting field is configured so that, for example, an observation method can be selected from a pull-down menu by using the input portion 50. The operator sets the observation method by selecting an observation method by using the input portion (observation-method input portion) 50. Information about the set observation method is transmitted to the background-identifying-condition setting portion 63 in the control portion 60 from the display portion 40.

The control portion 60 is provided with the background-identifying-condition setting portion 63. As shown in FIG. 19, the background-identifying-condition setting portion 63 stores a background identifying condition table in which the observation methods are associated with background identifying conditions for identifying the background regions in the image data. The background identifying conditions are a range of the background parameters $P_{BG\_Block}$ that is set so as to be satisfied by the background parameter $P_{BG\_Block}$ of the background region and so as not to be satisfied by the background parameters $P_{BG\_Block}$ of the specimen regions. In FIGS. 19, α, β, γ, and δ are upper-limit values or lower-limit values of the background parameter $P_{BG\_Block}$ of the background region. The background-identifying-condition setting portion 63 selects the background identifying conditions that correspond to the observation method received from the display portion 40 from the background identifying condition table, and sets the selected background identifying conditions in the automatic background identifying portion 35.

Figure 20:
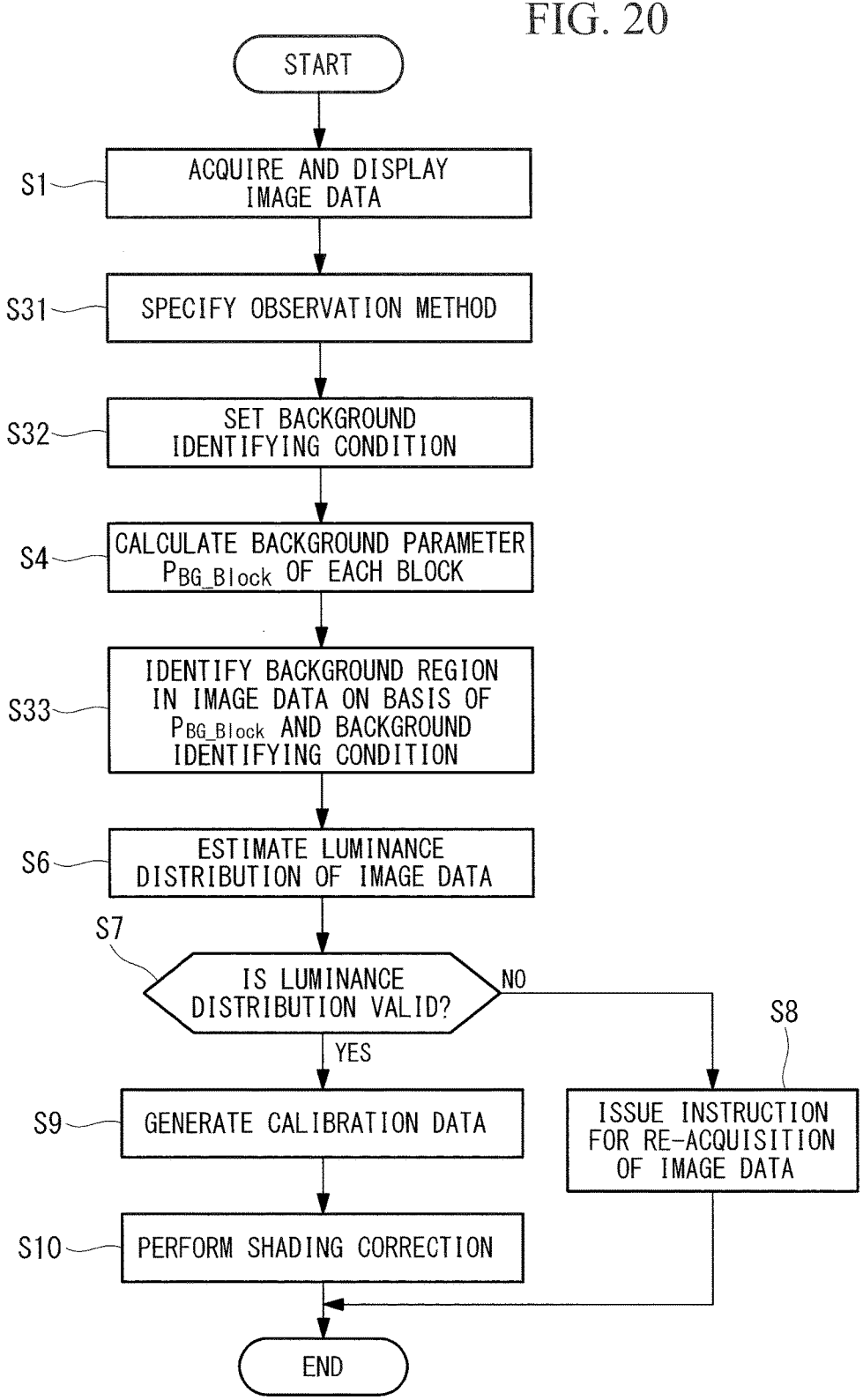
FIG. 20 is a flowchart showing the operation of the microscope system in FIG. 17.

Next, the operation of the thus-configured microscope system 2 will be described with reference to FIG. 20.

When the image-acquisition portion 20 acquires image data of an observation image of the specimens S formed by the microscope main unit 10, the image is displayed on the display portion 40 (step S1). The operator sets the observation method used to acquire the image data by manipulating the input device of the input portion 50 (step S31). Next, the background-identifying-condition setting portion 63 selects the background identifying conditions corresponding to the set observation method from the background identifying condition table, and the selected background identifying conditions are set in the automatic background identifying portion 35 (step S32).

Next, the automatic background identifying portion 35 calculates the background parameters $P_{BG\_Block}$ of the individual blocks in the image data by using Expression (2) (step S4), and a block having a background parameter $P_{BG\_Block}$ that satisfies the background identifying conditions is identified as a background region (step S33). For example, in the case in which the bright-field microscopy is set in step S33, a block whose background parameter $P_{BG\_Block}$ satisfies Expression (7) below is identified as the background region.

{Eq. 7}

$$\left(\alpha \leq \frac{2 \times R_{AVE}}{Gr_{AVE} + Gb_{AVE}} \leq \beta\right) \cap \left(\gamma \leq \frac{2 \times B_{AVE}}{Gr_{AVE} + Gb_{AVE}} \leq \delta\right) \quad (7)$$

Because steps S6 to S10 that follow are the same as steps S6 to S10 described in the first embodiment, descriptions thereof will be omitted.

As described above, with the microscope system 2 according to this embodiment, it is possible to identify the background regions from the entire image on the basis of the observation method specified by the operator and to estimate the background signal levels of the entire image on the basis of the distributions of the luminance signal levels of the identified background regions. Accordingly, there is an advantage in that shading in the image can be corrected in a simple and highly precise manner without having to remove the specimens S from the viewing field of the microscope main unit 10 or having to prepare a special correction specimen for the purpose of shading correction.
(Modification of the Second Embodiment)

Next, a microscope system 2' according to a modification of the second embodiment will be described with reference to FIGS. 21 and 22.

The microscope system 2' according to this modification differs from the microscope system 2 in terms of the control portion 60, and is configured so as to periodically judge whether or not there have been changes in the imaging conditions and to automatically execute re-acquisition and updating of the calibration data in the case in which there have been changes in the imaging conditions. Therefore, in this embodiment, the control portion 60 will mainly be described, other configurations that are in common with those of the above-described microscope systems 1, 1', and 2 will be given the same reference signs, and descriptions thereof will be omitted.

This modification assumes a case in which the image-acquisition portion 20 continuously acquires image data at a constant frame rate, and images of the specimens S are displayed on the display portion 40 as live images.

Figure 21:
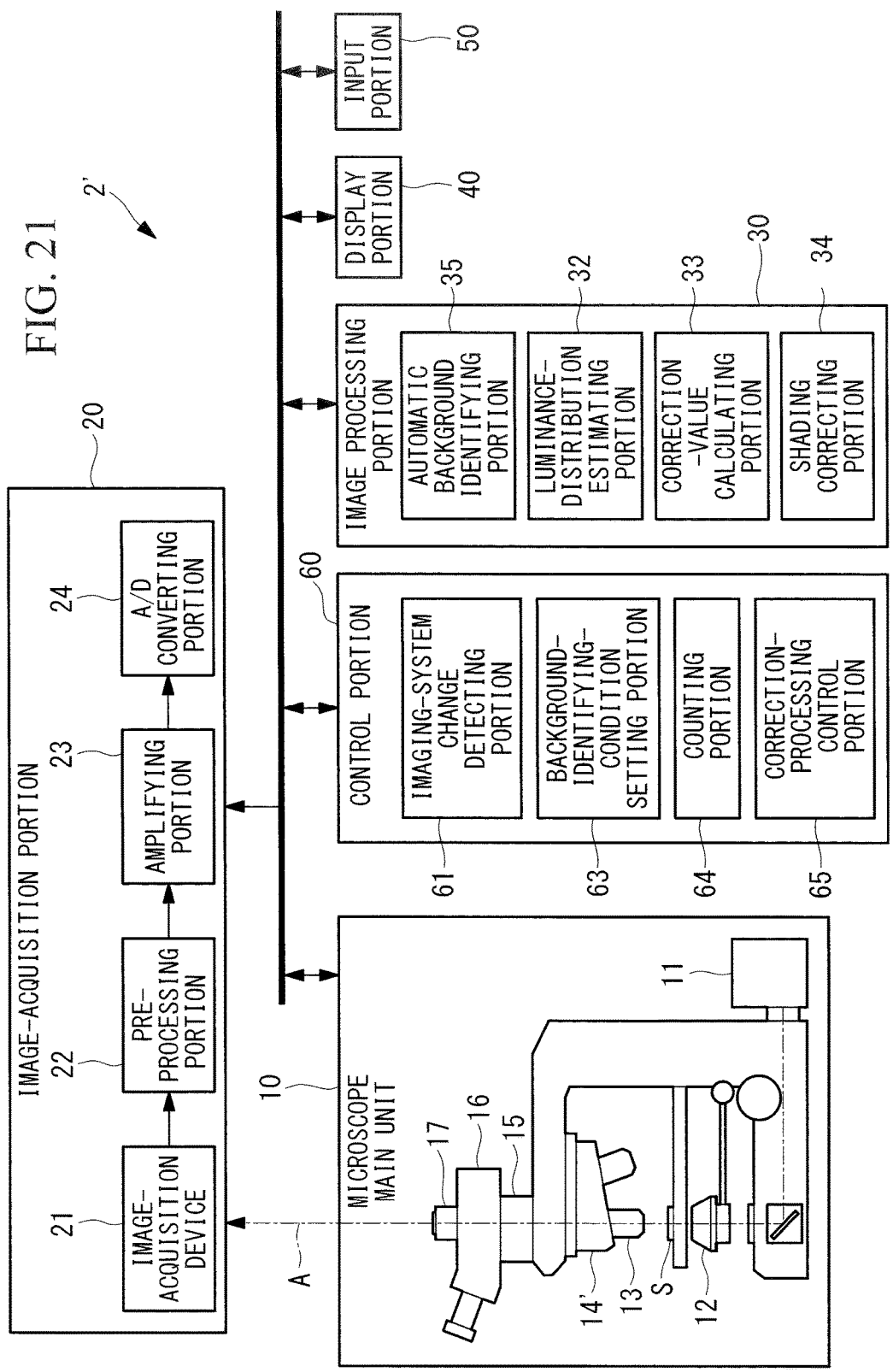
FIG. 21 is an overall configuration diagram of a modification of the microscope system in FIG. 17.
Figure 22:
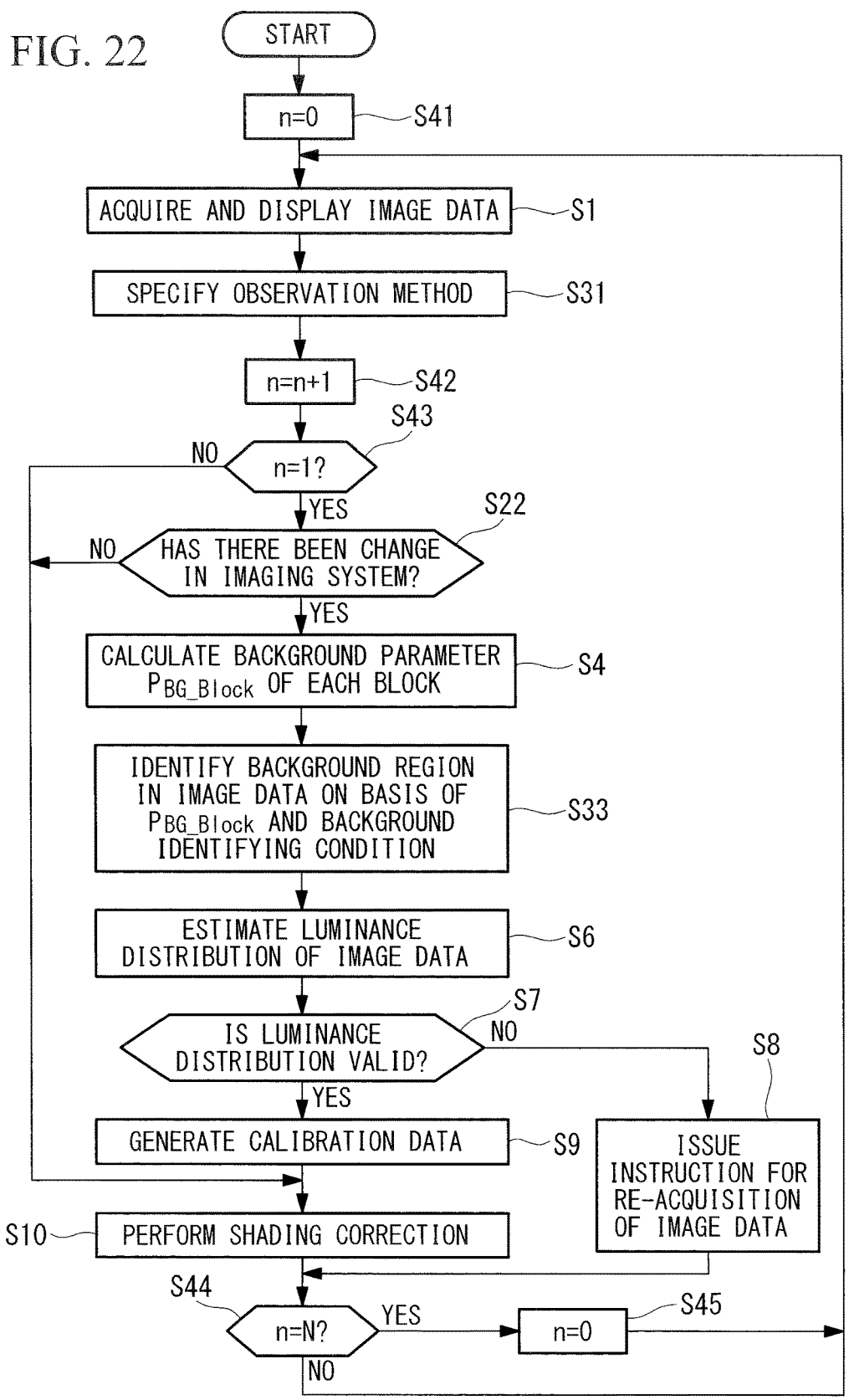
FIG. 22 is a flowchart showing the operation of the microscope system in FIG. 21.

As shown in FIG. 21, the control portion 60 according to this modification is additionally provided with the imaging-system change detecting portion 61, a counting portion 64, and a correction-processing control portion 65.

The imaging-system change detecting portion 61 detects the presence/absence of changes in the imaging conditions, as with the first embodiment. Therefore, in this modification, the microscope main unit 10 is provided with the revolver 14' shown in FIG. 12 and the imaging-condition setting fields 42 are displayed on the display portion 40.

The counting portion 64 repeatedly counts the number of times the image data are output from the A/D converting portion 24 starting from the first time to a predetermined number of times (N times). When the count is one, the counting portion 64 notifies the correction-processing control portion 65 about this information. In addition, after the count has reached the predetermined number (N times), the counting portion 64 resets the count to zero.

When notified that the count is one by the counting portion 64, the correction-processing control portion 65 causes the imaging-system change detecting portion 61 to detect the presence/absence of changes in the imaging conditions. Then, in the case in which changes in the imaging conditions are detected by the imaging-system change detecting portion 61, the correction-processing control portion 65 causes the automatic background identifying portion 35, the luminance-distribution estimating portion 32, and the correction-value calculating portion 33 to operate to re-acquire the calibration data, and thus, the calibration data to be used by the shading correcting portion 34 are updated to the most recent data.

Next, the operation of the thus-configured microscope system 2' will be described with reference to FIG. 22.

After the image acquisition by the image-acquisition portion 20 has started (step S41), each time the image data are output to the image processing portion 30 from the image-acquisition portion 20 (step S1), the counting portion 64 increments, one at a time, the count of the number of times the image data are output from 1 to N (step S42). Then, every time the count reaches N ("YES" in step S44), the count is reset to zero (step S45).

Here, in the case in which the count is equal to or greater than two ("NO" in step S43), the imaging-system change detecting portion 61 does not execute the judgment about the presence/absence of changes in the imaging conditions, and the shading correcting portion 34 executes shading correction by using the calibration data acquired on the basis of the image data that are older by one frame or more (step S10).

On the other hand, in the case in which the count is one ("YES" in step S43), the imaging-system change detecting portion 61 judges whether or not there have been changes in the imaging conditions (step S22). In the case in which it is judged that there have been changes in the imaging conditions ("YES" in step S22), the calibration data are acquired by executing steps S4, S33, S6, and S9, and the shading correcting portion 34 executes shading correction by using the newly acquired calibration data (step S10). On the other hand, in the case in which it is judged that there have not been changes in imaging conditions ("NO" in step S22), the shading correcting portion 34 executes shading correction by using the calibration data acquired on the basis of the image data that are one frame older or more (step S10).

As described above, with the microscope system 2' according to this modification, the presence/absence of changes in the imaging conditions is detected every time the image data for N frames are acquired, and the calibration data are re-acquired in the case in which the imaging conditions have been changed. In other words, the calibration data are quickly and automatically updated after the imaging conditions have been changed. By doing so, an image to which an appropriate shading correction has been applied can be displayed on the display portion 40.

The following aspects of the invention are derived from the above-described embodiments and modifications thereof.

An aspect of the present invention is a microscope system including an imaging portion that forms an image of a specimen; an image-acquisition portion that captures the image of the specimen formed by the imaging portion; a background identifying portion that identifies a background region other than a region containing the specimen in the image acquired by the image-acquisition portion; a calibration-data generating portion that generates calibration data for correcting shading contained in the image on the basis of a luminance distribution of the background region identified by the background identifying portion; and a shading correcting portion that corrects a luminance of the image by using the calibration data generated by the calibration-data generating portion.

With the present invention, the image of the specimen is acquired by capturing, with the image-acquisition portion, an optical image of the specimen formed by the imaging portion, the calibration data that makes the luminance irregularity in the background region in the image uniform are generated, and the shading correcting portion corrects the image by using the calibration data. By doing so, an image from which shading has been removed is generated.

In this case, the background region in the image is identified by means of computational processing executed by the background identifying portion. Therefore, it is possible to acquire the calibration data for shading correction without having to remove the specimen from the optical axis and thus, it is possible to acquire, in a simple manner, an image from which shading has been removed.

In the above-described invention may be provided with a background specifying portion that allows an operator to specify at least one location in the background region in the image acquired by the image-acquisition portion, wherein the background identifying portion may calculate a feature quantity of the location specified by the background specifying portion and may identify the background region in the image on the basis of the calculated feature quantity.

By doing so, the background region can be identified in the image with good precision by identifying a region having a feature quantity (for example, hue, brightness, saturation, or the like) the same as or similar to that at the location specified by the observer.

In the above-described invention may be provided with an observation-method input portion that allows an operator to input an observation method; and a storage portion that stores the observation method in association with a background identifying condition which a feature quantity of the background region satisfies, wherein the background identifying portion may read out, from the storage portion, the background identifying condition corresponding to the observation method input by means of the observation-method input portion, and may identify, in the image, a region that satisfies the read-out background identifying condition as the background region.

A feature quantity that differs between a specimen region and a background region varies depending on the observation method. Therefore, by storing, as the background identifying condition, an appropriate range of the feature quantities for each observation method in association therewith, the background region can be identified with good precision on the basis of only the observation method.

In the above-described invention, the calibration-data generating portion may estimate a luminance distribution of the entire region of the image on the basis of the luminance distribution of the background region identified by the background identifying portion, may calculate correction values for the individual pixels of the image so that the estimated luminance distribution becomes uniform, and may generate the calibration data constituted of the calculated correction values.

By doing so, it is possible to remove shading not only in the background region but also in the specimen region in a highly precise manner.

REFERENCE SIGNS LIST 1, 1', 2, 2' microscope system
13 objective lens (imaging portion)
20 image-acquisition portion
31 background identifying portion
32 luminance-distribution estimating portion (calibration-data generating portion)
33 correction-value calculating portion (calibration-data generating portion)
34 shading correcting portion
50 input portion (background specifying portion, observation-method input portion)
70 storage portion
S specimen

The invention claimed is:

1. A microscope system comprising:
an objective lens that forms an image of a specimen;
an image sensor that captures the image of the specimen formed by the objective lens; and
a processor comprising hardware, the processor being configured to:
identify a background region other than a region containing the specimen in the image acquired by the image sensor;
generate calibration data for correcting shading contained in the image on the basis of a luminance distribution of the identified background region; and
correct a luminance of the image by using the generated calibration data,
wherein the generating of the calibration data comprises:
estimating a luminance distribution of an entire region of the image on the basis of the luminance distribution of the identified background region,
calculating correction values for individual pixels of the image so that the estimated luminance distribution becomes uniform, and
generating the calibration data constituted of the calculated correction values.

2. The microscope system according to claim 1, wherein:
the processor is further configured to allow an operator to specify at least one location in the background region in the image acquired by the image sensor,
wherein the identification of the background region comprises calculating a feature quantity of the specified location and identifies the background region in the image on the basis of the calculated feature quantity.

3. A microscope system comprising:
an objective lens that forms an image of a specimen;
an image sensor that captures the image of the specimen formed by the objective lens; and
a processor comprising hardware, the processor being configured to:
identify a background region other than a region containing the specimen in the image acquired by the image sensor;

generate calibration data for correcting shading contained in the image on the basis of a luminance distribution of the identified background region;
correct a luminance of the image by using the generated calibration data;
allow an operator to input an observation method;
store the observation method in association with a background identifying condition which a feature quantity of the background region satisfies, and
identify, in the image, a region that satisfies the background identifying condition as the background region.

* * * * *